United States Patent [19]
Duval

[11] 3,844,943
[45] Oct. 29, 1974

[54] METHOD AND APPARATUS FOR PROCESSING WASTE WATER SLIMES OF STEEL MILL WATER TREATMENT SYSTEMS

[76] Inventor: Leonard A. Duval, 207 Harmon Rd., Aurora, Ohio 44202

[22] Filed: June 18, 1973

[21] Appl. No.: 370,971

[52] U.S. Cl.................... 210/67, 209/18, 209/39, 210/73, 210/259
[51] Int. Cl............................................ C02c 5/00
[58] Field of Search .............. 209/18, 39, 40, 172.5; 210/66, 67, 73, 74, 75, 152, 195, 196, 202, 223, 252, 259, 295, 512

[56] References Cited
UNITED STATES PATENTS

| | | | |
|---|---|---|---|
| 2,514,958 | 7/1950 | Lee | 209/18 |
| 2,726,763 | 12/1955 | Rakowsky | 209/172.5 |
| 2,781,906 | 2/1957 | Fontein | 209/172.5 |
| 2,860,782 | 11/1957 | Fontein | 209/172.5 |
| 3,502,271 | 3/1970 | Hays | 209/39 |

*Primary Examiner*—Frank A. Spear, Jr.
*Assistant Examiner*—Robert G. Mukai
*Attorney, Agent, or Firm*—Baldwin, Egan, Walling & Fetzer

[57] ABSTRACT

A method and apparatus are presented for processing a stream of water from a steel mill water treatment system where the water contains iron oxides, liquid oils, heavy oil particles, a slime of finely divided particles of waste materials, and water. The stream is first passed through an operation where a rough separation is made between the lighter components such as slime and oil and the heavier components such as the iron oxides, the heavy oil particles and much of the fine waste particles. The heavier particles are then passed through a classifier where again the heavier components are separated and the lighter oil, slime and water are discarded, after which the heavier material is again passed through a combined scrubber and classifier where extra water and oil solvent are added and the heavier material discharged from this operation, mostly iron oxide, is discharged to oxide storage. Again, the lighter oil slime and water are discharged. All of the oil, slime and water from these previous operations are passed to a thickener where the remaining solids in the stream are settled to the bottom by continuous non-turbulent agitation and liquid oil and water are removed at the top and separated from each other. The solids discharged from the thickener are forced by means of a pump serially through a magnetic separator and a cake filter, the oxides removed in the magnetic separator are discharged to the oxide storage and the cake from the filter is discharged to a filter cake storage. The filtrate from this filter is again discharged back to the thickener.

2 Claims, 5 Drawing Figures

PATENTED OCT 29 1974 3,844,943

METHOD AND APPARATUS FOR PROCESSING WASTE WATER SLIMES OF STEEL MILL WATER TREATMENT SYSTEMS

An object of the present invention is to treat the material coming largely from settling pits and settling lagoons in a steel mill so as to separate the valuable heavier components, mostly particulates of iron oxide, from the insoluble oils and lubricants and the water so as to recover the valuable raw material in the oxides, to conserve the waste volume, to render the waste material easily handled, to reduce sewer maintenance and to provide a cleaner water discharge.

Other objects and advantages of the invention will be apparent from the accompanying description and drawings and the essential features thereof will be set forth in the appended claims.

In the drawings,

FIG. 4 is an elevational view, enlarged, taken along the line 4—4 of FIG. 1; while

Figure 1:
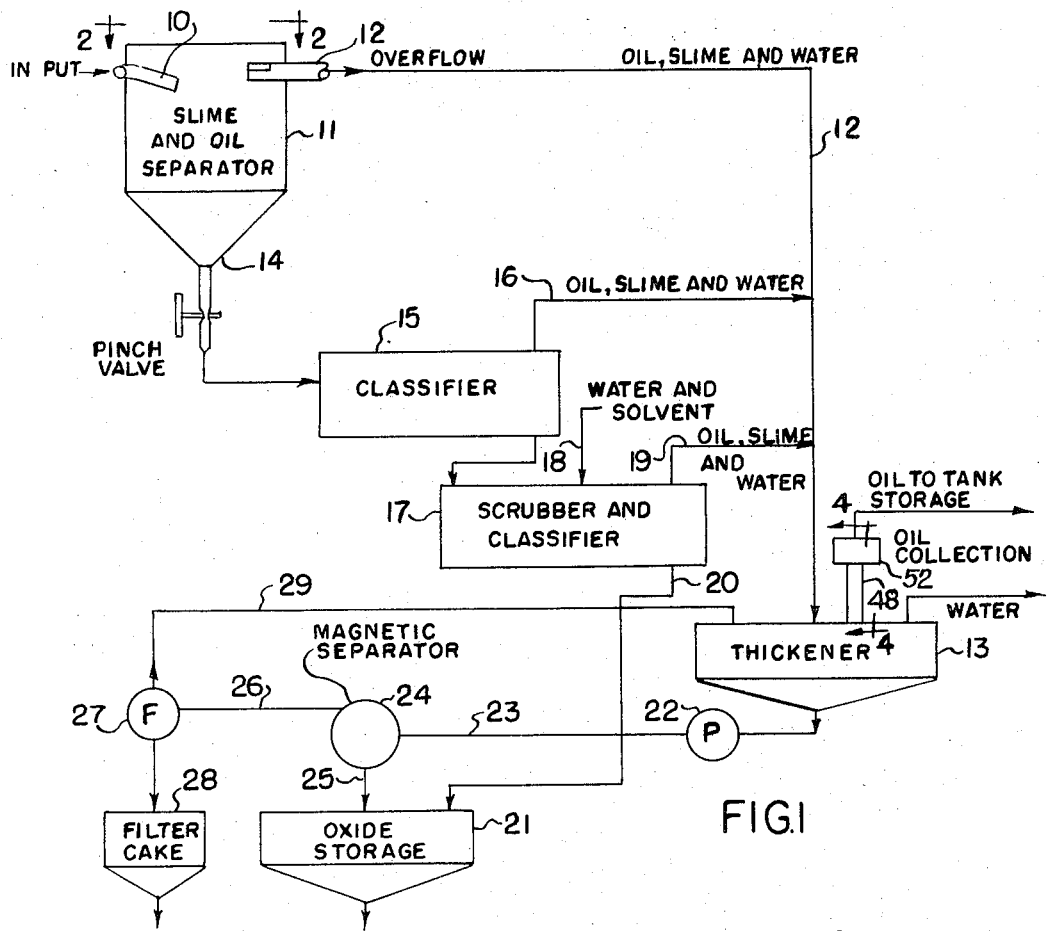
FIG. 1 is a diagram of the treatment system.
Figure 2:
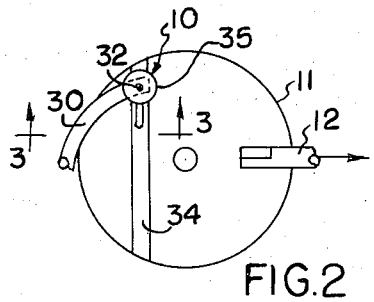
FIG. 2 is a top plan view, enlarged, taken along the line 2—2 of FIG. 1.
Figure 3:
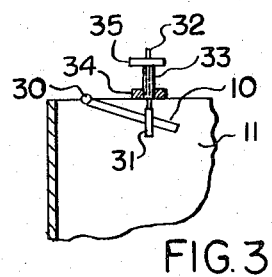
FIG. 3 is a fragmental sectional view taken along the line 3—3 of FIG. 2.

Referring to FIG. 1, the input indicated at 10 is preferably through a flexible hose 30 which is preferably arranged to permit adjustment of the input hose at different positions with respect to the side of the tank 11 and at different angles to the horizontal from about 12° to about 45°. Referring to FIGS. 2 and 3, a collar 31 is clamped on the hose near its end and is controlled by a vertical rod 32 which passes upwardly through a slot in a support bar 34 which extends across the tank, there being a nut 33 slidable along the bar 34 in which the vertical rod 32 is threaded. The vertical movement of the rod 32 is controlled by a hand wheel 35. The stream circulates generally in a spiral inside of the tank 11 in a non-turbulent manner giving the heavy particles, mostly iron oxide, an opportunity to settle out downwardly while the liquids, mostly water and oil, float upwardly and pass out through an overflow pipe 12. Preferably, this pipe is cut away for about one quarter of the circumference on the upper side of the pipe to insure a proper skimming action.

Figure 5:
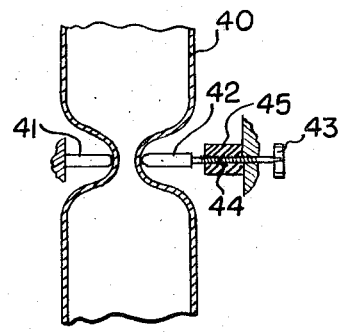
FIG. 5 is a sectional view, enlarged, through the pinch valve of FIG. 1.

Means is provided for controlling the discharge of the heavier components separated in the tank 11 through the converging bottom 14 thereof. One manner of control is shown in FIG. 5. A rubber connection 40 is provided at this outlet and means is provided to pinch the rubber tube to control the discharge. This is shown as embodying a fixed abutment 41 on one side of the tube and a movable abutment 42 on the other side, the position of which is controlled by hand wheel 43 manipulating the threaded portion 44 of a valve stem which is received in a fixed threaded abutment 45. The overflow from the separator tank 11 passes through the outlet 12, mostly oil, slime and water, and so passes to a thickener 13.

The heavier components discharge from the tank 11, pass through line 46 to a classifier 15. This classifier may be of any suitable type but a typical piece of equipment is a screw classifier of which a Style C and a Style S are made under the trade name TELSMITH, manufactured by Smith Engineering Works of Milwaukee, Wis. This classifier works in the usual manner to separate the heavier components of the stream from the lighter components thereof, such as oil, slime and water. The latter passes through the line 16 and line 12 to the thickener 13. The heavier material is discharged and fed to the intake end of a combined scrubber and classifier indicated at 17. This again may be of any suitable type but the TELSMITH Style C and Style S are suitable for use at this point. As the material passes through the driving screw of the scrubber and classifier, additional water and solvent are added through line 18. The water may be any reasonably clear water and the solvent is suitable for dissolving the heavier oil and lubricant particles which are still contained in the stream when it passes through the apparatus at 17. A suitable solvent is sold as NALCO 8920 by Nalco Chemical Co. of Chicago, Ill. The heavier components discharge from the classifier 17 at 20 consisting mostly of oxides which are transferred directly to an outside storage bin 21. The lighter components discharging from the classifier 17 are discharged through the line 19 and line 12 to the thickener.

Figure 4:
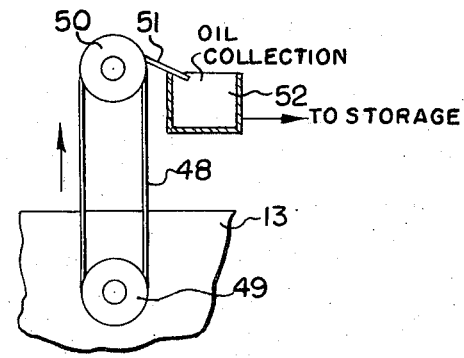

The lighter components discharge from the vertical generally cylindrical vessel 11 through line 12, and the lighter components discharge from the classifier 15 through line 16, and the lighter components discharge from the combined scrubber and classifier 17 through line 19 and are all fed to the thickener 13. A standard thickener may be utilized for this piece of equipment. One such is the Eimco Swing Lift thickener made by The Eimco Machinery Division of Envirotech corporation of Salt Lake City, Utah. Another suitable piece of equipment is a Rake thickener made by Ecodyne Corporation of Chicago, Ill. As is well known, such a thickener permits the remaining solids in the stream to settle to the bottom by continuous non-turbulent agitation by a revolving rake arrangement or otherwise, while the liquid oil and water rise to the top. Preferably the water and the oil are separated by a suitable arrangement, one of which is shown in FIG. 4. This comprises a neoprene belt 48 which is driven by pulley 49 beneath the surface of the liquid in thickener tank 13 in the direction of the arrow, where it passes over an idler pulley 50 and thereafter the oil is removed by means of a scraper 51 into a tank 52 from which the oil may be conducted away to a storage point. A suitable belt oil skimmer is made by Monroe Environmental Corp. of Monroe, Mich.

The heavy components which settle to the bottom of the thickener 13 are driven by pump 22 through line 23 to a magnetic separator 24. The magnetic particulates separated at 24 pass directly through line 25 to the oxide storage. These particulates are substantially mill scale. The overflow from the separator passes through line 26 to a cake filter 27 from which the filter cake passes through a means to the filter cake storage 28. The overflow from the filter 27 passes through line 29 back to the thickener.

Many pumps are suitable for use at the point 22 for handling a stream which has plenty of solids in it. One such is shown in U.S. Pat. No. 2,380,283, granted July 10, 1945 to C. W. VanRanst. Another suitable pump has two gear-like rotors with interfitting rubber teeth having enough resilience to pass the solids through between the gears at the same time that the liquids are passing through.

A suitable magnetic drum separator of the wet type is made by Stearns Magnetics, Inc. of Cudahy, Wis.

A filter suitable for use at 27 is a Denver Disc filter manufactured by Denver Equipment Company of Denver, Col. Another suitable filter for this use is a rote cloth filter put out by the Osaka Chemical Plant Engineering Association in Osaka, Japan.

Several sizes of equipment have been developed to carry out this invention. One size utilizes a tank 11 which is 6 feet in diameter and 8 feet in depth having a 6 inch inlet at 10 and a 24 inch outlet at 12 with a controlled discharge at 42, 43 between one inch and six inch equivalent diameter opening. The water pressure at the inlet was 55 pounds per square inch. Another unit had a tank 11 4 feet in diameter and 6 feet in depth with a 4 inch inlet and a 18 inch overflow at 12 and with a discharge outlet at 42, 43 between 1 inch and 4 inch diameters. This used a water inlet of 45 pounds per square inch. A third unit utilized a tank 11 of 2 feet in diameter, 4 feet in depth having an inlet of 2 inch diameter and an outlet overflow 12 inches in diameter. The discharge at 42, 43 was between ½ inch and 2 inches equivalent diameter. The water pressure in this case was 45 pounds per square inch at the inlet.

The method and apparatus hereinabove described has successfully recovered substantially all of the iron oxide, mostly mill scale, in the effluent from a steel mill, together with a certain recovery of oil at 51, 52, with other waste material suitably reduced in volume at 28 and with the discharge of water from the thickener 13 of sufficient cleanliness to be generally acceptable.

What is claimed is:

1. A method for processing a stream of waste water slimes of steel mill water treatment systems where the waste water contains iron oxides, liquid oils, heavy oil particles, and a slime of finely divided particles of waste materials and water; comprising first separating lighter components such as said liquid oils and said slimes and most of said water from heavier components such as said oxides and heavy oil particles and much of said fine waste particles by introducing the initial stream in a tangential, non-turbulent, downward flow in a vertical, generally cylindrical vessel; discharging said heavier components at the bottom of said vessel and discharging said light components at the top of said vessel; controlling the flow of said waste water and contents in said vessel by varying the flow of said discharging heavier components and by varying the angle of said inlet stream downwardly relative to the horizontal and tangentially relative to the wall of said vessel; secondly passing said heavier components through a classifier so as to separate the heavier components still in the stream, mostly oxides, from the lighter components which enter the classifier; thirdly passing the heavier components discharged from said classifier through a combined scrubber and classifier, while feeding extra water and a solvent from said heavy oil particles into said scrubber and classifier; fourthly passing the heavier components discharged from said scrubber and classifier, mostly oxides, to an oxide storage bin; passing said lighter components discharged from said vertical generally cylindrical vessel, and discharged from said classifier, and discharged from said combined scrubber and classifier to a thickener where the remaining solids in the stream are settled to the bottom by continuous non-turbulent agitation and liquid oil and water are removed at the top and separated; passing the solids discharged from said thickener by means of a pump serially through a magnetic separator and a cake filter during which the oxides removed in said magnetic separator are discharged to said oxide storage bin, said cake from said filter is discharged to a filter cake storage, and the filtrate from said filter is discharged to said thickener, whereby waste water slimes are easily handled, iron oxides and oils and lubricants are recovered, solid waste volume is reduced and concentrated, sewer maintenance is reduced, and the final water discharged is of a cleanliness generally acceptable.

2. An apparatus system for processing a stream of waste water slimes of steel mill water treatment systems where the waste water contains iron oxides, liquid oils, heavy oil particles, and a slime of finely divided particles of waste materials and water; comprising a generally cylindrical separator vessel with its axis vertical; a waste water inlet pipe positioned to introduce said stream into the top of said vessel generally tangentially thereof, means for adjusting said inlet pipe inclined downwardly at an angle to the horizontal between about 12° and about 45°; means for adjusting said pipe at varying distances from the wall of said separator vessel; means for overflow from said separator vessel communicating with a thickener; a discharge outlet near the bottom of said separator vessel; means for controlling the flow through said outlet; means communicating from said discharge outlet to the inlet end of a classifier; means for conducting the overflow of lighter components from said classifier to said thickener; means for conducting heavier components from said classifier to the inlet end of a combined scrubber and classifier; means for introducing scrubbing water and solvent to said combined scrubber and classifier; means for conducting the overflow of lighter components from said combined scrubber and classifier; means for conducting heavier components from said combined scrubber and classifier to an iron oxide storage bin; means for skimming oil from the top of said thickener; means for draining water from the top of said thickener; means for passing the heavier components from the bottom of said thickener successively through a magnetic separator and a cake filter; means for transferring the separated particles from said magnetic separator to said iron oxide storage; means for transferring the filter cake from said filter to a filter cake storage; and means communicating between said filter and said thickener to transfer the filtrate from said filter to said thickener.

* * * * *